Aug. 29, 1950 A. I. ZAROW 2,520,189
PROCESSING ALCOHOLIC BEVERAGE DISTILLATES
Filed Dec. 21, 1946
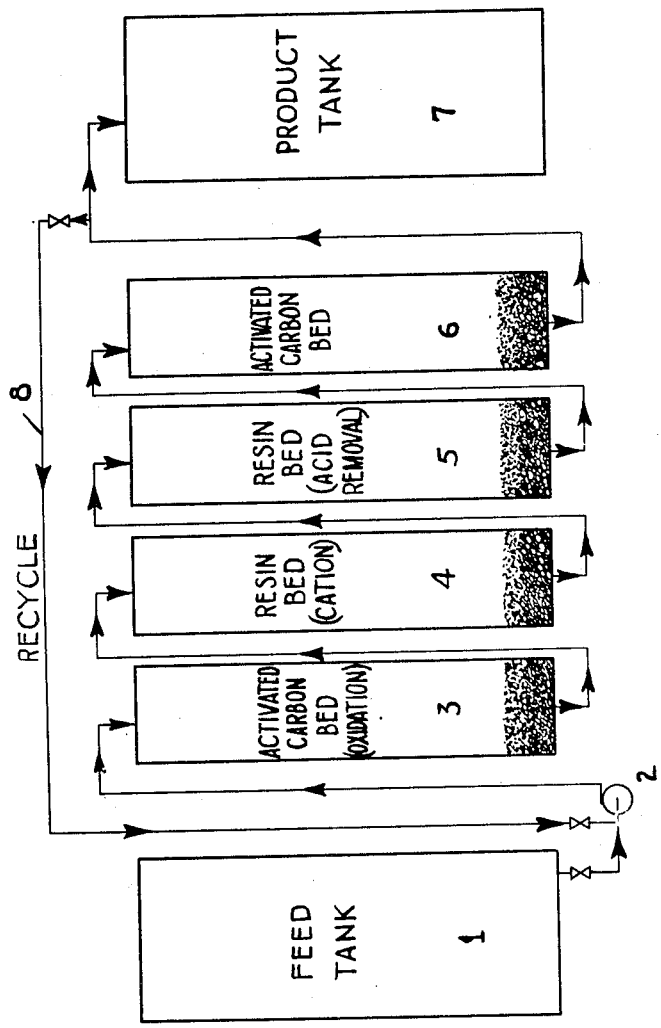
INVENTOR
Albert I. Zarow
BY
ATTORNEY

Patented Aug. 29, 1950

UNITED STATES PATENT OFFICE 2,520,189

PROCESSING ALCOHOLIC BEVERAGE DISTILLATES

Albert I. Zarow, Louisville, Ky., assignor, by mesne assignments, to Beverage Process Corporation, Louisville, Ky., a corporation of Kentucky Application December 21, 1946, Serial No. 717,651

2 Claims. (Cl. 99—48)

This invention relates broadly to the treatment of alcoholic beverage distillates which are distilled from fermented grain, molasses, fruit and the like and characterized by a disagreeable flavor and odor. The invention is particularly suited to the treatment of young or green whisky, and for that reason, its application to green whisky is hereinafter described.

Because green whisky is characterized by a disagreeable flavor and odor, it has long been customary to age it in charred white oak barrels for long periods of time in order to improve its flavor and odor. This universally used and highly beneficial conventional practice is so expensive that those engaged in this art have been constantly striving, during the past fifty years more or less, for some faster or otherwise less expensive way of either accomplishing the same end or of so improving the green whisky as to reduce the aging period normally required to produce a given quality. While some improvements have possibly been made, progress is extremely difficult because the factors which occasion improvement in whisky during aging remain largely unknown since they occur in quantities or traces so minute as to defy analyses.

The principal object of the present invention is to provide a simple, fast, inexpensive and continuous method of treating green spirits which results in the immediate production of a spirit having a highly agreeable flavor and odor and a marked reduction in its tactual property or bite.

Another object is to provide a method capable of rapid performance in simple and inexpensive apparatus which is easy to install, operate and maintain.

My invention resides in a process, the preferred form of which comprises: (1) passing the green whisky through a mass of activated carbon; (2) passing the carbon treated whisky through a water and alcohol insoluble cation exchanger; (3) directing the whisky from the cation exchanger through a water and alcohol insoluble anion exchanger; (4) next passing the whisky through another mass of activated carbon; and (5) finally withdrawing a major part of the whisky from the system as the final product and recycling the remainder through the entire system. In this method, step 3 and step 2 are considered essential and each of the remaining steps desirable or advantageous.

I have found that the disagreeable properties, which characterize green whisky, are immediately lost when it is treated as outlined in the above noted process. In fact the immediate whisky product of this process has a more agreeable flavor and odor than that normally expected in whiskies which have been conventionally aged in charred barrels for one to two years more or less. Additionally, its tactual property or bite is reduced to a point below that normally encountered in whiskies which have been conventionally aged for substantially longer periods of time.

It is difficult, if not impossible, at the present time to determine precisely all of the factors responsible for such marked improvement. The process apparently removes the nitrogen and sulphur compounds which are partly if not entirely responsible for the off odor so characteristic of green whisky. Since the tactual property or bite of whisky is generally attributed to its acid content, it is plausible to believe that the removal of acids is responsible in the present process for the marked reduction in the bite of the whisky produced. Precisely what other factors may be affected by the treatment is not known to me at this time.

The drawing schematically illustrates an apparatus for practicing the invention. In this apparatus, a continuous stream of green whisky is drawn from a feed tank 1 by a pump 2 and forced successively through an activated carbon vessel 3, a cation exchange vessel 4, an anion exchange vessel 5, and another activated carbon vessel 6. The whisky issuing from the last activated carbon vessel 6 may be entirely directed into the product vessel 7 but preferably a portion of it is recycled back through the system through line 8 which connects the outlet of the last activated carbon vessel with the inlet of the first activated carbon vessel.

In the apparatus illustrated each of the vessels 3–6 is provided with one or more layers of an inert filtering material such as gravel or coal which has been coked and treated to remove all reactive substances. Where separate layers of the inert filtering material are used, they preferably are conventionally graduated in size.

The first activated carbon vessel 3 may, for example, be five feet high and one and one-half feet in diameter. It is provided with a mass of activated carbon approximately 28 inches deep or 4.10 cubic feet, more or less. The activated carbon may be of any suitable character such as that presently sold under the trade name "Nuchar." The particle size should be small since the active surface presented by the carbon increases as the particle size decreases.

The cation exchanger vessel 4 may be dimensioned the same as the activated carbon vessel 3 and provided with a mass of cation exchange material approximating 4.1 cubic feet. This material likewise should be of small particle size since the capacity of the exchanger increases in proportion to the surface it presents. Any cation exchange material may be used which is water and alcohol insoluble and acid resistant. There are a number of such exchange materials now available such as: sulfonated coal mentioned in U. S. Patent #2,240,116 and the similar materials mentioned in U. S. Patent #2,378,307; phenol formaldehyde resin containing nuclear sulfonic acid radicles or groups; and phenol formaldehyde resin containing sulfonic acid groups ($SO_3H$).

The anion exchanger vessel 5 may be 5 feet high and 2½ feet in diameter. It is charged with approximately 2 feet of anion exchange material so as to have a volume approximating 9.8 cubic feet. The particle size of this material should likewise be small. The anion exchange material should be water and alcohol insoluble and acid resistant. There are a number of anion exchange materials now available such as: the biguanide-formaldehyde condensation products mentioned in U. S. Patent #2,251,234; modified urea-formaldehyde type resins where the urea is almost equal in structure to either melamine and guanidine; and aliphatic polyamine formaldehyde resin. These acid anion exchange materials are charged by treatment with sodium hydroxide, sodium carbonate or other weak solutions of alkaline material. They are conventionally called acid removing, although it is not known whether they actually remove the acid molecule from the whisky or simply the anions of the acid in exchange for hydroxyl ions.

The next activated carbon vessel 6 may be a reproduction of activated carbon vessel 3.

With the apparatus illustrated, the pump 2, is intended to set up a flow approximating 8 gallons per minute at 10 pounds pressure. The present indications are that 25,000 wine gallons, more or less, of whisky may be treated before reactivation is required. To reactivate, the activated carbon vessels 3 and 6 are back washed with distilled or demineralized water until the pH of the back wash output is the same as the pH of the back wash input.

The cation exchanger is back washed with 10 gallons per minute of city water for approximately 10 minutes. It is then regenerated with 0.4 normal sulphuric acid solution for approximately 10 minutes and finally rinsed with city water at the rate of 8 gallons per minute until the acidity of the outgoing rinse water is no greater than approximately 10 parts per million, more or less, over the incoming rinse water.

The anion exchanger is back washed for ten minutes with a 22 gallon per minute stream of water issuing from the regenerated cation bed. Thereafter, it is regenerated with 0.75 normal sodium carbonate solution using approximately 30 gallons of the solution. Finally it is rinsed with water issuing from the regenerated cation exchanger, this rinsing action continuing until the solids, in the water issuing from the anion exchanger, equal approximately 5 parts per million.

While recycling is not necessary, it is preferred; hence approximately 20% of the whisky issuing from the last activated carbon vessel is recycled.

As indicated previously, whisky which is passed through either the activated carbon vessel or the cation exchanger and then through the anion exchanger is very substantially improved over green whisky. This improvement is quite marked. When it is passed successively through all three vessels, in the order named, the improvement is extremely marked. The resulting product has a very pleasant odor, a very pleasant taste and very little, if any bite. Its odor and taste compare favorably with that of whisky that has been aged from 1 to 2 years or even more, while its bite is equivalent to that of whisky aged 3 years and even more. The product has none of the properties which characterize untreated green whisky. Since it has little or no color, it may be additionally treated in regular charred white oak barrels or with charred white oak chips for a period sufficient to impart some color to it. Normally, a treatment of this character can be satisfactorily consummated within a few days.

The treated whisky, with or without the coloring treatment, is of such quality as to render it highly salable; hence it may be bottled and sold. Moreover, this treatment being easily and inexpensively performed may be advantageously used on whisky which is intended to be stored in charred white oak barrels for aging purposes. The product resulting from the aging of my treated whisky for a given period will normally be far superior to an untreated whisky aged in the same way for the same period.

While I have stressed the application of my process to whisky distilled from fermented grain, it will be understood that the process is applicable to alcoholic beverage material of higher proof than that which is normally called whisky including neutral spirits and that it is also applicable to the treatment of other products such as rum produced from fermented molasses or sugar solutions, brandy produced from fermented fruit solutions and the like.

Having described my invention, I claim:

1. A method of processing an alcoholic distillate derived from a fermented sacchariferous mash to improve the qualitative properties thereof comprising: placing the distillate in intimate contact with a mass of activated carbon; thereafter placing the treated distillate in intimate contact with a mass of acid resistant, hydrogen cation exchange material which is insoluble in said distillate; and finally placing the distillate, treated according to the foregoing steps, in intimate contact with a mass of acid resistant anion exchange material which is insoluble in said distillate.

2. A method of processing an alcoholic distillate derived from a fermented sacchariferous mash to improve the qualitative properties thereof comprising: intimately treating the distillate with an insoluble acid resistant, hydrogen cation exchange material; then intimately treating the treated distillate with an insoluble, acid resistant, anion exchange material.

ALBERT I. ZAROW.

REFERENCES CITED

The following references are of record in the file of this patent:

UNITED STATES PATENTS

| Number | Name | Date |
|---|---|---|
| 2,097,545 | Bowden et al. | Nov. 2, 1937 |
| 2,114,331 | Brown | Apr. 19, 1938 |
| 2,258,216 | Ramage | Oct. 7, 1941 |
| 2,372,233 | Thurston | Mar. 27, 1945 |
| 2,404,367 | Durant et al. | July 23, 1946 |
| 2,419,628 | Cohen | Apr. 29, 1947 |
| 2,469,683 | Dudley | May 10, 1949 |

OTHER REFERENCES

Industrial & Eng. Chem., Feb. 1943, pages 251 to 254.